Figure 1:
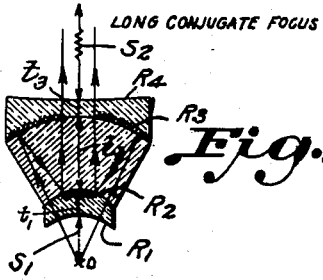

Oct. 27, 1953

B. S. BLAISSE 2,656,761

LARGE-APERTURE OPTICAL SYSTEM COMPRISING
TWO REFLECTING AND REFRACTING SPHERICAL
SURFACES IN AXIAL ALIGNMENT

Filed Oct. 9, 1950

INVENTOR
Berndt Stephan Blaisse,

BY Wenderoth, Lind & Ponack
ATTORNEYS

Patented Oct. 27, 1953

2,656,761

UNITED STATES PATENT OFFICE 2,656,761

LARGE-APERTURE OPTICAL SYSTEM COMPRISING TWO REFLECTING AND REFRACTING SPHERICAL SURFACES IN AXIAL ALIGNMENT

Berndt Stephan Blaisse, Voorburg, Netherlands, assignor to N. V. Optische Industrie "De Oude Delft," Delft, Netherlands Application October 9, 1950, Serial No. 189,104
In the Netherlands October 11, 1949

23 Claims. (Cl. 88—57)

The object of the invention is to provide an optical system which comprises only a small number of optically active surfaces and which nevertheless has a large numerical aperture (N. A.).

In principle, this may be achieved by the use of a spherical concave mirror corrected for aberrations with the use of one or more correcting lenses, as is already known. Although such mirror objectives have proved to be highly satisfactory for many applications there is in practice a need for mirror objectives of even larger N. A.

According to the invention, this may be ensured in the first place with an optical system for the enlarged imagery of small objects or for the reduced imagery of large objects comprising in optical alignment a meniscus lens, a spherical concave first-surface mirror and a convex first-surface mirror. The meniscus lens and the concave mirror are concave towards the short conjugate focus of the optical system and the meniscus lens being located between said short conjugate focus and said concave mirror. The convex mirror is formed by a reflecting layer on the central portion of the convex surface of said meniscus lens and has a smaller radius of curvature than the concave mirror and the concave mirror has a central zone which is at least partly light-transmitting.

A first type of the optical system according to the invention, which is corrected for large apertures, comprises in optical alignment from the short conjugate focus towards the long conjugate focus of said optical system spaced spherical surfaces comprising a first refracting surface, a partly reflecting surface, a concave reflecting surface which is concave towards said short conjugate focus, and a second refracting surface exposed to the air. The space between said partly reflecting surface and said concave reflecting surface is filled with transparent material having a refractive index greater than 1. The partly reflecting surface has a central reflecting zone which acts as a convex mirror which is curved in the same sense as and has a shorter radius of curvature than said concave reflecting surface, and said partly reflecting surface having a light-transmitting marginal zone. The concave reflecting surface has a central light-transmitting zone. The relative position of said spaced spherical surfaces is such that lightrays emanating from the short conjugate focus traverse successively said first refracting surface and said partly reflecting surface, are then reflected at said concave reflecting surface back towards said partly reflecting surface, which reflects the rays through said central light-transmitting zone of said concave reflecting surface, whereupon said second refracting surface is traversed.

This system will be described in more detail hereinafter with reference to Fig. 1. It has the following features: smaller curvature of the image; corrected for much greater apertures; the concave reflecting surface and the surface which is partly reflecting and acts as a convex mirror, are fixed onto the same glass block, so that any decentering of these surfaces is automatically obviated.

In order to increase the luminosity of the system it is advantageous to introduce between the central reflecting zone and the light-transmitting marginal zone of said partly reflecting surface, a zone which is partially transmitting and partially reflecting. In a special form this additional zone is increasingly partially transmitting from the reflecting zone and decreasingly partially reflecting. A second form, which is particularly advantageous for manufacturing, is characterized in that said central reflecting zone, which acts as a convex mirror, is made partly light-transmitting and the light-transmitting marginal zone is made partly reflecting, preferably in such a way that said partly reflecting surface is, over its full diameter, uniformly reflecting and uniformly transmitting.

Another advantageous form of the optical system according to the invention is obtained if the three transparent substances provided on each side of said concave reflecting surface and said partly reflecting surface are chosen to be such that the indices of refraction are the same for one wavelength. Thus the portions of the said surfaces which are wholly or in part light-transmitting, have no refracting action upon the light rays of this wavelength, so that said surfaces do not contribute to chromatic aberration.

If three identical transparent substances are chosen, or at least substances having the same indices of refraction for one wavelength and the same dispersions then the said surfaces have no refraction action upon the passing light rays for any wavelength.

Figure 2:
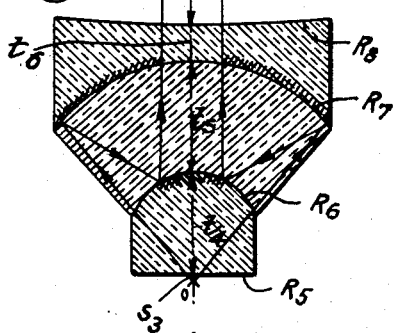

A typical form of optical system according to the invention which is represented in Fig. 1 and Fig. 2, is characterized in that it is built up from four optically active spherical surfaces, of which the two outer ones are spherical and refractive and the inner ones constitute the two partially reflecting surfaces, it being possible for the second refracting surface adjacent the enlarged image (or object) to be made plane.

A particularly advantageous embodiment is obtained by making the second refracting surface spherical with a radius of curvature such that it has its center in or in the vicinity of the axial point of the enlarged image or the large object. This affords the particular advantage that the light rays towards said axial point, or emanating therefrom, have normal incidence on said spherical surface, so that chromatic aberration does not occur. According to the invention, a similar step may be taken for the first refracting surface which is located on the side of the shorter conjugate, so that here chromatic aberration is also obviated. This results in a system of high luminosity corresponding to a N. A. of, for example, 0.60, which system comprises only 4 surfaces and is fully achromatic, although all the optical parts are made from the same material, for example crown glass. According to the invention, as an alternative, the first refracting surface adjacent the small object may be made plane and use may be made of immersion. Thus, a N. A. of for example, 0.90 is obtained with only three optically active surfaces, the system being again fully achromatic.

According to the invention, it is desirable that a cemented surface should be provided in the space between the partly reflecting surface and the concave reflecting surface, in order to facilitate the relative centering of said surfaces, since during the time in which the cement is still soft, an image may be produced with the system and the two parts of the objective may be relatively shifted along the cemented surface until the image is free from asymmetry aberrations at the center of the field of view, which aberrations only occur if the centering is not correct.

It is advisable that the partly reflecting surfaces should be formed as interference mirrors consisting of one or more layers which have little or no absorption and thus do not give rise to loss of light.

According to the invention, if the N. A. has to be still greater, say 1.25, an aplantic lens or a reflecting surface used apalantically may be added to the objective at the side of the short conjugate focus.

According to the invention, a further method of increasing the N. A. consists in that the optical system according to any of the types described above has added to it an optical element in the path of rays between the short conjugate focus and the first refracting surface of said system. The optical element is optically aligned therewith and comprises a concave refracting surface having its center of curvature in proximity to the first conjugate focus of said optical element, also used is a semi-transmitting cemented surface and a concave mirror with the concave mirror concave towards the first conjugate focus of said optical element and having a small central light-transmitting portion and being located in proximity to the short conjugate focus of the optical system which coincides with the second conjugate focus of said optical element. The relative position of the surfaces of said optical element being such, that light rays emanating from its first conjugate focus traverse successively said concave refracting surface and said semi-transmitting cemented surface, are then reflected at said concave mirror back towards said semi-transmitting cemented surface which reflects the rays towards said small central light-transmitting portion of said concave mirror.

The addition of this optical element produces the desired enlargement of N. A. without affecting the correction of the original objective. The resulting combination furthermore has the following important advantages:

(1) The false light is removed by the concave mirror of the optical element in a simple and efficacious manner, since the small aperture in this mirror is provided in an intermediate image and is preferably chosen to be no larger or substantially no larger than the intermediate image. All or substantially all non-effective light rays are thus intercepted by the concave mirror.

(2) The working distance is considerably increased.

It may under certain conditions be desirable that the cemented surface in the optical element should be made as a partly reflecting spherical mirror which is curved towards the short conjugate focus of the optical element.

Figure 5:
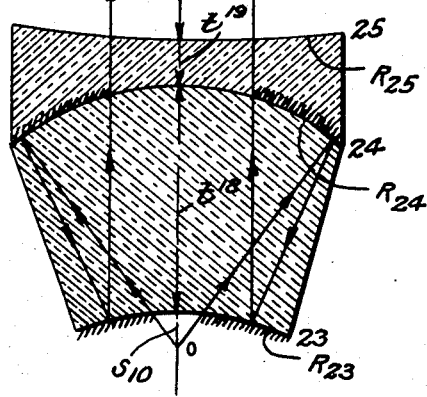

A still further form of the optical system according to the invention, comprises in optical alignment from the short conjugate focus towards the long conjugate focus of said optical system spaced spherical surfaces comprising a first refracting surface, a convex and a concave mirror, both mirrors being concave towards said short conjugate focus and having a central light-transmitting zone and the space between said mirrors being filled with transparent material having a refractive index greater than 1. The distance between the short conjugate focus and the concave mirror is smaller than the radius of curvature of said concave mirror and the relative position of the spaced spherical surfaces is such that lightrays emanating from the short conjugate focus traverse successively said first-refracting surface and said light-transmitting zone of said convex mirror, are then reflected at said concave mirror back towards said convex mirror, which reflects the rays through said central light-transmitting zone of said concave mirror, whereupon said second refracting surface is traversed. Thus, a large N. A. is obtained with very simple means as is shown in Fig. 5.

The invention will now be explained more fully by reference to the accompanying drawings showing some examples of the optical system according thereto.

Fig. 1—5, are respectively sectional views of optical systems according to the invention, each embodying one form thereof and each being especially adapted for microscopy.

One example is shown in Fig. 1. The radii of curvature of the surfaces 1, 2, 3, 4 and the mutual distances follow from the table below:

| Surface | Radius of curvature in mm. | axial thickness and axial separation in mm. |
|---|---|---|
| Object 0 | | $S_1$ = 8.51 |
| 1 | $R_1$ = 8.51 | $t_1$ = 5.3 |
| 2 | $R_2$ = 7.59 | $t_2$ = 13.2 |
| 3 | $R_3$ = 20.89 | $t_3$ = 3.0 |
| 4 | $R_4$ = 181.97 | $S_2$ = 181.97 |
| Image at center of surface 4 | | |

The object 0 is located at the center of curvature of the surface 1, the axial point of the image being at the center of curvature of surface 4. The surface 2 has a centeral, wholly silvered zone of 2.4 mm. in diameter, which is surrounded by an annular, partly reflecting zone having an outer diameter of 6.2 mm. The surface 3 is reflecting except a central non-reflecting portion of 6.1 mm. in diameter. The lenses constituted by the surfaces 1, 2 and 3, 4 respectively have diameters of 14.2 and 30.4 mm. respectively. Since surfaces 1 and 4 are concentric with the axial points of the object and the image respectively, there is no chromatic aberration. Furthermore, the three components are made from the same kind of glass, so that the non-reflecting parts of the surfaces 2 and 3 have no refracting action. The optical system is thus achromatic.

The aperture angle of the wholly inactive central portion of the light beams is 10°, the total aperture angle being 66°. The N. A. is 0.55 and the equivalent focal length is 5.7 mm.

A second example, which is shown in Fig. 2, fundamentally differs from the preceding one only in that here use is made of immersion. The data for this embodiment is as follows:

| Surface | radius of curvature in mm. | axial thickness and spacing in mm. |
| --- | --- | --- |
| Object 0 | | $S_3=0.8$ |
| 5 | $R_5=\infty$ | $t_4=4.0$ |
| 6 | $R_6=2.51$ | $t_5=4.364$ |
| 7 | $R_7=6.92$ | $t_6=1.0$ |
| 8 | $R_8=181.97$ | $S_4=181.97$ |
| Image at center of curvature of surface 8 | | |

The completely silvered central portion of surface 6 has a diameter of 1.0 mm., the partly reflecting marginal zone has an outer diameter of 2.5 mm. and the aperture in the reflecting layer of surface 7 has a diameter of 2.4 mm. The aperture angle of the wholly inactive central portion of the light beams is 12°, the largest aperture angle being 76°. The numeral aperture is 0.90 and the equivalent focal length is 1.4 mm.

Figure 3:
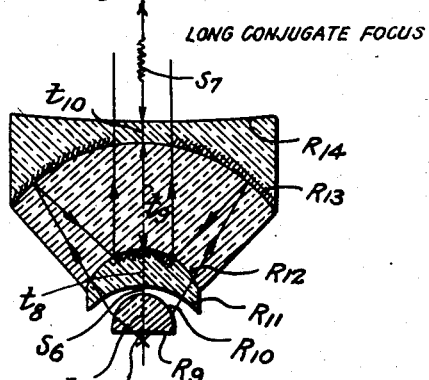

Fig. 3 shows a system, the data of which is as follows:

| Surface | radius of curvature in mm. | axial thickness and spacing in mm. |
| --- | --- | --- |
| Object 0 | | $S_5=0.6$ |
| 9 | $R_9=\infty$ | $t_7=1.9$ |
| 10 | $R_{10}=1.29$ | $S_6=0.14$ |
| 11 | $R_{11}=3.39$ | $t_8=1.53$ |
| 12 | $R_{12}=2.51$ | $t_9=4.38$ |
| 13 | $R_{13}=6.91$ | $t_{10}=1.0$ |
| 14 | $R_{14}=181.97$ | $S_7=181.97$ |
| Image at center of curvature of surface 14 | | |

The plane-convex front lens constituted by surfaces 9 and 10 is used aplanatically and with immersion. The axial point of the image produced of the object by this front lens is located at the center of curvature of surface 11. The wholly reflecting central portion of surface 12 has a diameter of 1.1 mm., and the partly reflecting layer of surface 13 has a diameter of 2.4 mm. The aperture angle of the inactive central portion of the light beams is 23°, the largest aperture angle being 122°.

The above-mentioned examples are described when used as microscope objectives. However, it is evident that such systems are also applicable if a large object is to be reproduced at reduced size, the path of rays in this case only being reversed.

Figure 4:
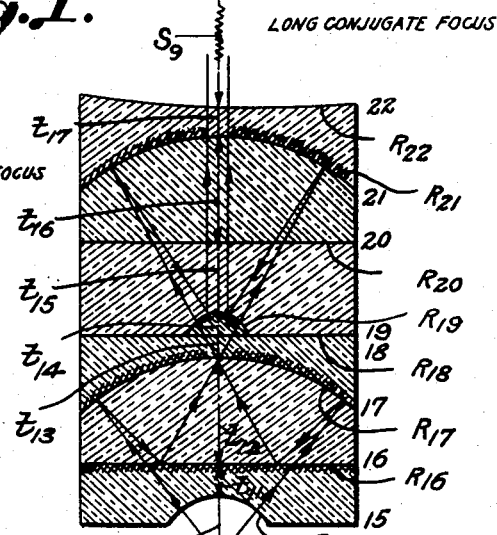

Fig. 4 shows an objective which may be used either dry or with immersion. The radii of curvature and the thicknesses follow from the table below:

| Surface | radius of curvature in mm. | axial thickness and spacing in mm. |
| --- | --- | --- |
| Object 0 | | $S_8=4.2$ |
| 15 | $R_{15}=4.2$ | $t_{11}=1.0$ |
| 16 | $R_{16}=\infty$ | $t_{12}=7.1$ |
| 17 | $R_{17}=13.18$ | $t_{13}=1.4$ |
| 18 | $R_{18}=\infty$ | $t_{14}=1.4$ |
| 19 | $R_{19}=1.82$ | $t_{15}=4.29$ |
| 20 | $R_{20}=\infty$ | $t_{16}=7.0$ |
| 21 | $R_{21}=13.18$ | $t_{17}=1.71$ |
| 22 | $R_{22}=181.97$ | $S_9=181.97$ |
| Image at center of curvature of surface 22 | | |

The N. A. with cedar-oil immersion is 1.10 and the equivalent focal length f=0.88 mm.

The plane surfaces 18 and 20 are optically inactive. The surface 20 is provided in order to simplify the relative centering of the surfaces 19 and 21. The surface 16 is silvered to be semi-transmitting, the surface 17 being active as a concave mirror. This mirror 17 is provided with a small hole at the axial point of the intermediate image. Consequently, the surface 17 only transmits the effective light rays, so that false light is avoided. The surface 19 is active as a spherical convex mirror and is wholly reflecting in its central zone, which is surrounded by a partly transmitting zone and a wholly transmitting zone respectively. The surface 21 is active as a concave mirror and is made transmitting only at its central zone to allow the passage of light rays towards the image. The refracting surface 22 has its center of curvature at the axial point of the image (not shown).

When use is made of homogeneous immersion, the surface 15, instead of being concave with center of curvature at the axial point of the object, may be made plane, or at least with a smaller curvature.

Finally, Fig. 5 shows an example of an immersion objective having the following data:

| Surface | radius of curvature in mm. | axial thickness and spacing in mm |
|---|---|---|
| Object 0 | | $S_{10}=0.73$ |
| 23 | $R_{23}=6.01$ | $t_{18}=4.32$ |
| 24 | $R_{24}=6.01$ | $t_{19}=1.0$ |
| 25 | $R_{25}=181.6$ | $S_{11}=181.6$ |
| Image at center of curvature of surface 25 | | |

The surface 23 has a reflecting marginal zone and a non-reflecting central zone, similarly as surface 24. In this particular embodiment the first refracting surface and the convex mirror surface are materially identical, as the central zone of surface 23 fulfills also the function of refracting surface. If two different surfaces are applied, the central light transmitting zone of the convex mirror is formed by a partly reflecting surface, which is similar to surface 2 in Fig. 1, but the reflecting and light-transmitting zones are reversed. With only three optical surfaces, an apochromatic objective is thus obtained having a N. A. of 0.93. All lenses in this example and the preceding examples are made from the same material, viz. borosilicate crown glass, so that chromatic aberration is avoided. It is evident that use may alternatively be made of other materials, notably those absorbing ultraviolet rays to a small extent such, for example, as quartz.

Furthermore, in the objective represented in Fig. 3, the chromatic aberrations introduced by the aplanatic lens formed by surfaces 9 and 10, will be preferably corrected by applying transparent materials of different dispersion at both sides of surface 12.

Other modifications will be apparent to those skilled in the art without departing from the scope of the present invention as defined in the appended claims.

What I claim is:

1. An optical system for the enlarged imagery of small objects or for the reduced imagery of large objects comprising in optical alignment from the short conjugate focus towards the long conjugate focus of said optical system spaced spherical surfaces comprising a first refracting surface, a partly reflecting surface, a concave reflecting surface which is concave towards said short conjugate focus, and a second refracting surface exposed to the air, the space between said partly reflecting surface and said concave reflecting surface being filled with transparent material having a refractive index greater than 1, said partly reflecting surface having a central reflecting zone which acts as a convex mirror which is curved in the same sense as and has a shorter radius of curvature than said concave reflecting surface, said partly reflecting surface having a light-transmitting marginal zone which forms an interface between two media with refractive indices greater than 1, said concave reflecting surface having a central light-transmitting zone, the relative position of said spaced spherical surfaces being such that light rays emanating from the short conjugate focus traverse successively said first refracting surface and said partly reflecting surface, are then reflected at said concave reflecting surface back towards said partly reflecting surface, which reflects the rays through said central light transmitting zone of said concave reflecting surface, whereupon said second refracting surface is traversed.

2. An optical system as claimed in claim 1, and wherein said central reflecting zone and said light-transmitting zone of said partly reflecting surface are separated by a zone which is partially transmitting and partially reflecting.

3. An optical system as claimed in claim 2, and said partially reflecting zone being non-light-absorbing.

4. An optical system as claimed in claim 1 and wherein said central reflecting zone, which acts as a convex mirror, is made partly light-transmitting and said light-transmitting marginal zone is made partly reflecting, preferably in such a way that said partly reflecting surface is over its full diameter uniformly reflecting and uniformly transmitting.

5. An optical system as claimed in claim 4, and said partially reflecting zone being non-light-absorbing.

6. An optical system as claimed in claim 1 and wherein said central reflecting zone and said light-transmitting zone of said partly reflecting surface are separated by a zone which is increasingly partially transmitting from the reflecting zone and decreasingly partially reflecting.

7. An optical system as claimed in claim 1, and wherein said second refracting surface is one of the surfaces of a lens which is cemented with its other surface onto said concave reflecting surface at the side of the long conjugate focus of said optical system.

8. An optical system as claimed in claim 7, said concave reflecting surface forming an interface between two media with refractive indices which are the same for one wavelength.

9. An optical system as claimed in claim 1, said second refracting surface being plane.

10. An optical system as claimed in claim 1, said second refracting surface having its center of curvature in proximity to the long conjugate focus of said optical system.

11. An optical system as claimed in claim 1, said second refracting surface having its center of curvature in the long conjugate focus of said optical system.

12. An optical system as claimed in claim 1, adapted for use with immersion, said first refracting surface being plane.

13. An optical system as claimed in claim 1, said first refracting surface having its center of curvature in proximity to the short conjugate focus of said optical system.

14. An optical system as claimed in claim 1, said first refracting surface having its center of curvature in the short conjugate focus of said optical system.

15. An optical system as claimed in claim 1, a plane cemented surface being provided in the space between said partly reflecting surface and said concave reflecting surface.

16. An optical system as claimed in claim 1, and including an aplanatic lens in optical alignment with said objective and being located between the short conjugate focus and said first refracting surface.

17. An optical system as claimed in claim 1, and including an aplanatically used additional refracting surface in optical alignment with said objective and being located between the short conjugate focus and said first refracting surface.

18. An optical system as claimed in claim 1, and including an optical element added between the short conjugate focus of said optical system and said first refracting surface, said optical element being optically aligned therewith and comprising a concave refracting surface having its center of curvature in proximity to the first conjugate focus of said optical element, a semitransmitting cemented surface and a concave mirror, said concave mirror being concave towards the first conjugate focus of said optical element and having a small central light-transmitting portion and being located in proximity to the short conjugate focus of said optical system which coincides with the second conjugate focus of said optical element, the relative position of the surfaces of said optical element being such, that light rays emanating from its first conjugate focus traverse successively said concave refracting surface and said semi-transmitting cemented surface, are then reflected at said concave mirror back towards said semi-transmitting cemented surface which reflects the rays towards said small central light-transmitting portion of said concave mirror.

19. An optical system as claimed in claim 18, and wherein a plane refracting surface is substituted for said concave refracting surface of said optical element.

20. An optical system for the enlarged imagery of small objects or for the reduced imagery of large objects comprising in optical alignment from the short conjugate focus towards the long conjugate focus of said optical system spaced spherical surfaces comprising a first refracting surface, a partly reflecting surface, a concave reflecting surface which is concave towards said short conjugate focus, and a second refracting surface exposed to the air, the space between said partly reflecting surface and said concave reflecting surface being filled with transparent material having a refractive index grater than 1, said partly reflecting surface having a marginal reflecting zone which is curved in the same sense as said concave reflecting surface, said partly reflecting surface having a light-transmitting central zone which forms an interface between two media with refractive indices greater than 1, said concave reflecting surface having a central light-transmitting zone, the relative position of said spaced spherical surfaces being such that light-rays emanating from the short conjugate focus traverse successively said first refracting surface and said partly reflecting surface, are then reflected at said concave reflecting surface back towards said partly reflecting surface, which reflects the rays through said central light transmitting zone of said concave reflecting surface, whereupon said second refracting surface is traversed.

21. An optical system as claimed in claim 20 and wherein said central light-transmitting zone and the marginal reflecting zone of said partly reflecting surface are separated by a zone which is partially transmitting and partially reflecting.

22. An optical system as claimed in claim 20, and wherein said central light-transmitting zone of said partly reflecting surface is made partly reflecting and the marginal reflecting zone is made partly light-transmitting, preferably in such a way that said partly reflecting surface is over its full diameter uniformly reflecting and uniformly light-transmitting.

23. An optical system as claimed in claim 20, and wherein the marginal reflecting zone and said light-transmitting zone of said partly reflecting surface are separated by a zone which is increasingly partially reflecting from the central zone and decreasingly partially light-transmitting.

BERNDT STEPHAN BLAISSE.

References Cited in the file of this patent

UNITED STATES PATENTS

| Number | Name | Date |
|---|---|---|
| 2,156,911 | Brown | May 2, 1939 |
| 2,198,014 | Ott | Apr. 23, 1940 |
| 2,378,301 | Kaprelian | June 12, 1945 |
| 2,380,887 | Warmisham | July 31, 1945 |
| 2,448,699 | Bouwers | Sept. 7, 1948 |
| 2,478,762 | Johnson | Aug. 9, 1949 |
| 2,520,636 | Grey | Aug. 29, 1950 |

FOREIGN PATENTS

| Number | Country | Date |
|---|---|---|
| 709,243 | Germany | Aug. 11, 1941 |
| 256,273 | Switzerland | Feb. 16, 1949 |

OTHER REFERENCES

Maksutov, "New Catadioptric Meniscus Systems," Journal Optical Society of America, vol. 34, No. 5, May 1944, pages 270 through 284, 278 and 279. Published by American Institute of Physics, Inc., 57 East 55th Street, New York 22, New York.